No. 865,965. PATENTED SEPT. 10, 1907.
G. H. EARP-THOMAS.
ART OF GROWING AND DISTRIBUTING NITRO GATHERING BACTERIA.
APPLICATION FILED JAN. 17, 1907.
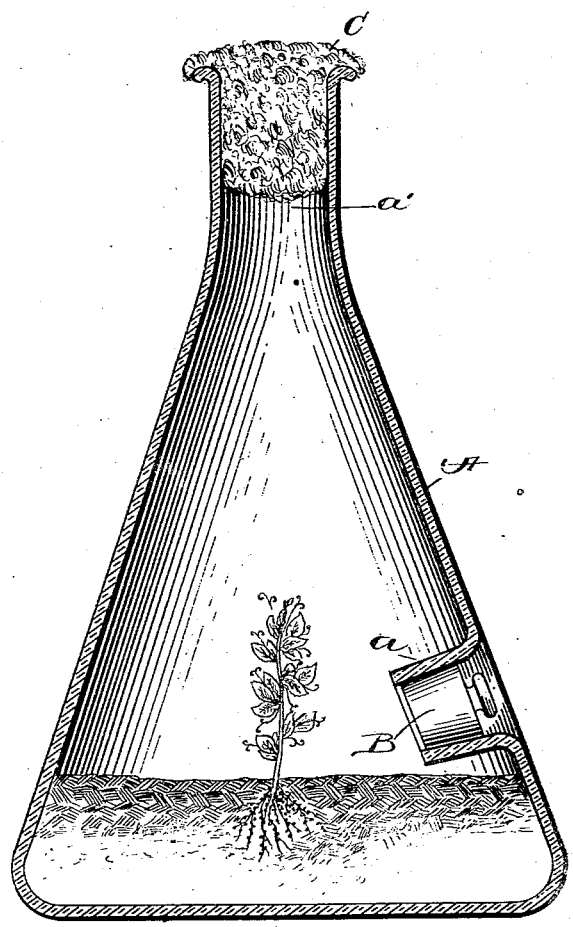
Witnesses
E. O. Hildebrand
N. Reynolds
Inventor
George Herbert Earp-Thomas
By George Massie
his Attorneys

UNITED STATES PATENT OFFICE.

GEORGE HERBERT EARP-THOMAS, OF TORONTO, ONTARIO, CANADA.

ART OF GROWING AND DISTRIBUTING NITRO-GATHERING BACTERIA.

No. 865,965.

Specification of Letters Patent.

Patented Sept. 10, 1907.

Application filed January 17, 1907. Serial No. 352,768.

*To all whom it may concern:*

Be it known that I, GEORGE HERBERT EARP-THOMAS, a citizen of New Zealand, residing at 400 Bloor street, Toronto, Canada, have invented certain new and useful Improvements in the Art of Growing and Distributing Nitrogen-Gathering Bacteria; and I do hereby declare the following to be a full, clear, and exact description of the invention, such as will enable others skilled in the art to which it appertains to make and use the same.

My invention relates to improvements in the art of growing and distributing nitrogen gathering bacteria.

It is known that certain bacteria which live at the roots of plants have the power of collecting nitrogen from the air and supplying it to the said plants. It is also known that it is advantageous to grow cultures of such nitrogen gathering bacteria in laboratories and distribute the same to agriculturists in order that they may directly inoculate the seeds before planting, whereby an increased growth of the plants and an increased yield is obtained. In growing such cultures in the laboratory it has been the practice heretofore first to obtain some of the desired bacteria from plants taken from the field or garden and then to implant such bacteria so obtained upon a suitable medium which is then kept under the desired conditions to propagate the colonies, the culture thus obtained being generally known as the stock culture, which laboratory stock culture serves as a source of germs from which to propagate the cultures to be distributed to the agriculturists. Unfortunately, the process of obtaining a satisfactorily pure culture direct from plants growing in the field or garden is a tedious and slow procedure, because of the difficulty of excluding contaminations, such as molds, yeasts and soil bacteria of a kind other than that desired. It might seem that once a pure culture of the desired bacteria had been obtained that there would never be any further need to go again to the growing plant for the germs, but that from the stock culture other cultures might be propagated indefinitely. However, owing to the fact that the characteristic properties of these bacteria become modified by the food upon which they live, it results that a laboratory stock culture, after some time, consists of bacteria which have, to a certain extent, lost their power of fixing nitrogen for the plant, or in other words have become what is known as attenuated, that is to say, less virulent than before and therefore less valuable to the farmer for inoculating seed than a freshly prepared stock culture. Therefore, under the present methods, it is customary to discard the stock culture from time to time and make a fresh one from the virile bacteria of the soil grown living plant.

It is one of the objects of my invention to avoid the above described disadvantage, and this I do by the means more fully explained hereinafter.

There is also a further great disadvantage connected with the old method, which is due principally to the necessity for the frequent renewal of the stock culture and to the great similarity which exists between the nitrogen gathering bacteria and other soil bacteria which are useless for inoculating seed. This disadvantage is that when a new culture has been made, if it be examined under the microscope, it may appear to be the desired nitrogen gathering bacteria and yet really may be some form of soil bacteria useless for the purpose required. Apparently the only really reliable test of a culture is to put it in practical use, that is, to inoculate seed with it and then grow a plant from such seed. This test has been employed heretofore, but under such conditions as often to render the test inconclusive, for the reason that the possibility of the inoculation of the plant from sources other than the stock culture, was not absolutely excluded. Consequently, by the old method of procedure it is possible to have cultures of bacteria satisfactorily pass all the tests to which they have been submitted and be sent to the farmer as nitrogen-gathering bacteria, when in fact they were not nitrogen gathering bacteria but were merely some other form of bacteria which were useless for the purpose intended.

It is a further object of my invention to avoid this disadvantage, which I do by the means hereinafter explained.

Furthermore, although the nitrogen gathering bacteria so far generally known are supposed to be and probably are of one species only, the results attained in actual practice have shown that there is a difference in the bacteria dependent upon the species of plant upon which the stock culture was obtained. For example, bacteria obtained originally from the roots of red clover will not produce as satisfactory results when employed for inoculating alsike as would bacteria originally obtained from the roots of an alsike plant, and on the other hand the latter will not be satisfactory for the inoculation of red clover. Apparently the characteristics of the bacteria are modified by the food upon which they live, so that when for example, the red clover bacteria are placed upon red clover seed they are ready to thrive on the roots of the growing plant, whereas when placed upon some other seed, as for example, on alsike seed, they find their environment and food less suitable to them and hence are not as vigorous in their attacks on the plant roots. However, the bacteria have the power of finally adapting themselves to the changed conditions, that is to say, after many generations are produced upon the new kind of host the race finally becomes accustomed to the new host and is enabled to carry on its function satisfactorily. Unfortunately, this adaptation of the bacteria to its strange host requires some time, and the consequence is that seed inoculated with bacteria unadapted to it does not have the advantage of a quick growth when first starting and thus a part of the growing season is lost, which would not be the case were the proper kind or variety of bacteria present on the seed at the moment of germination. Owing to this necessity for employing the proper kind of bacteria for each kind of plant, it has been necessary to maintain many different kinds of stock cultures in the laboratory each containing bacteria adapted for a particular plant. Also it has been necessary first to ascertain from a purchaser, the kind of plant which he intended to inoculate before his order could be filled. And as it is necessary to make up the cultures in distributing packages prior to the opening of the season for which they are to be used, so that orders may be filled without delay, it has been necessary to make a supply of distributing packages of each kind of bacteria.

It is a further object of my invention to avoid this difficulty which I do by the means hereinafter described.

With these general objects in view, and some others which will be obvious to those skilled in the art from the description hereinafter, my invention consists in the features and details which will first be described in connection with the accompanying drawing and then particularly pointed out in the claims.

The drawing is an elevation of a stock culture embodying one part of my invention.

Referring to the drawing, A is a receptacle or container, in this case of suitable transparent material, as for example, glass, and provided with an opening at one side arranged to be closed by a suitable closure. In the present example, the desired result is attained by providing the receptacle with a tubulature indicated at $a$ which may be closed by a stopper which will exclude germs, as for example, a tightly fitting glass stopper B.

The upper part of the receptacle A is provided with means for supplying it with sterilized air that is to say air which is free from germs of any kind. In the present instance, I obtain this result in a simple manner by providing the receptacle A at the upper part with an opening, $a'$ in which may be inserted a filtering device for filtering the air so that all germs will be removed as the outside air passes through the filter into the receptacle A. As a filter a plug of cotton is generally employed, this being indicated at C.

Within the receptacle, I place a suitable medium, taking care to have both sterilized by any well known methods, the medium in the preferred form of my invention being non-nitrogenous and substantially transparent. In my Patent 816,850, dated April 3, 1906, I have described a medium which is very suitable for this purpose. In this medium, I place one or more seeds taken from the desired kind of plant in such a way as to insure that the seed is free from bacteria of any kind. For the purpose of accomplishing this result I may proceed in the following manner. I take a seed-head of the desired plant and carefully sterilize the same by passing it several times through the flame, such as the flame of an alcohol lamp, in order to make certain that all organisms on the outside of the seed-head are destroyed by the heat. The seeds themselves within their seed cases or pods are not injured by the heat if the work is properly done. Apparently there are no injurious germs within the seed-pod, if the latter is perfect, that is, if it has not been punctured, whereby it results that the sterilization of the exterior of the seed-head in a manner such as described will enable the operator to remove the seeds from their pods by means of suitable sterilized instruments and transfer the same under the usual aseptic laboratory conditions, to the medium in the receptacle. Thereafter, the medium may be inoculated with the desired culture of nitrogen gathering bacteria, through the tubulature. The receptacle thus prepared may be placed in a suitable situation in order to receive a proper amount of light and heat, whereby the seed germinates and the bacteria at once start to work in the rootlets.

The medium being non-nitrogenous, the bacteria are compelled to obtain their entire supply of nitrogen from the atmosphere. The plant in turn takes its nitrogen from the bacteria and thus grows rapidly, a little sterilized water being added to the medium from time to time as may be required. As the bacteria are growing and multiplying upon their natural host, they have a vitality and obtain a virulency which is even greater than that of the bacteria living upon a plant growing under natural conditions in earth. Furthermore, as the medium is transparent the development of the colonies may be watched and the growth of the plant itself serves to determine whether the bacteria in the medium are the true nitrogen gathering bacteria or not for if they are not the plant will not thrive, whereas if they are the plant will flourish and will develop tubercles on the roots. Such a laboratory stock culture being once established there will be no need thereafter to go to the original source for bacteria, namely, to the soil grown plant, because there is not only no loss in virulency of the bacteria on a stock culture such as I have described, but if anything an increase above the average of those cultures made directly from the soil-grown plant. When now it is desired to make other cultures from the described stock culture it is only necessary to remove the stopper from the tubulature, insert a sterilized pair of forceps and remove a tubercle from the roots of the plant which may then be used in any desired manner to inoculate the new medium. The bacteria thus obtained are in a most virulent form and absolutely reliable. The danger of contamination is substantially eliminated and the new cultures are produced quickly and with certainty.

Although I have referred above to the use of the tubercle for inoculating a fresh medium from the stock culture, it is also possible to use some other portion of the root of the plant, as for example, a piece of one of the small root hairs, for these also contain some bacteria.

While I have hereinabove described the receptacle and its contents as a stock culture, it is also to be understood that when a stock culture is obtained by the old method, my invention may be employed as a means for testing such stock culture. That is, the seed may be planted in the medium in the receptacle just as hereinbefore described and then inoculated not to serve as a stock culture, but merely to determine whether or not the bacteria employed are of the proper kind. For such a purpose the receptacle may be smaller, because it is not necessary to provide much room for the plant. The first growth of the plant will finish the test and determine whether the bacteria are of the desired kind or not. In preparing these test cultures, it is advisable to make the medium as transparent as possible and the receptacle may be small enough so that it can conveniently be examined under the microscope. I have found an ordinary test tube with a plug of cotton in its open end to serve satisfactorily. With such test cultures it is possible to observe the bacteria at work upon the plant. This test is particularly useful in exposing to view the nitrogen gatherers which enter the roots but for some reason do not form nodules. These bacteria are often sufficiently energetic and numerous to aid the plant without any external evidence of their presence being visible.

In order to be prepared to fill all orders which may be received for cultures to inoculate the various kinds of plants which it is customary to inoculate, a series of stock cultures each with a different species of plant growing therein may be prepared and kept on hand.

The distributing vessels may be prepared and filled with medium, inoculated and sealed in the manner described in my said Patent 816,850 each distributing vessel being inoculated with its own kind of bacteria from the desired stock culture. However, I have found that it is an important improvement upon the process set forth in said patent to proceed as follows: After the distributing vessel has been sterilized, supplied with a semi-solid or rather substantially solid sterilized medium, inoculated and incubated in the manner described in my said patent, a small portion of sterilized water should be poured on top of the medium and the receptacle then closed, as for example, by hermetically sealing the same, whereupon the distributing package is ready for shipment or storage.

The advantage of the solid medium is that there is less danger of spilling the same in handling the vessels prior to sealing and hence less care is required in placing them in the incubator. But the foremost advantage is that the growth of the colonies may be observed with a solid medium whereas it cannot with a liquid medium. The advantage of the liquid medium is that the bacteria can subdivide more readily than in a semi-solid medium, and hence will propagate quicker. Therefore, by following the process set forth above, I attain the advantage of a solid medium during the period of preparation of the cultures prior to sealing and yet also attain the advantage of the liquid medium after sealing, thus leaving the bacteria in a favorable condition for a further development during storage and shipment.

In the above description, I have assumed that the medium in the distributing vessels is inoculated with one kind only of the nitrogen gathering bacteria. However, an important feature of my invention consists in inoculating the medium in each distributing vessel with a plurality of kinds of nitrogen gathering bacteria, as will now be more fully explained. To do this, I first form a composite colony of a plurality of kinds of bacteria, by inoculating some medium in a suitable vessel with cultures taken separately from the different stock cultures, thus combining in one culture bacteria suitable for different kinds of plants. After this composite stock culture has been formed, the distributing vessels are inoculated from it whereby instead of each distributing vessel containing only one kind or variety of the nitrogen gathering bacteria, it contains a plurality of kinds. Consequently, such a culture is suitable for use in inoculating the seed of anyone of the kinds of plant from which the bacteria were originally obtained. However, and this is an important feature of my invention, it is not necessary to use as much if any larger quantity of such a composite culture in inoculating the seed than is required with the simple culture, for the reason that there is enough of the specific kind of bacteria to attack the rootlets at the time the seed germinates and thus start the young plant into rapid growth by which time the other kinds of bacteria have adapted themselves to their changed conditions and then can thrive on the plant roots and assist in the growth of such plant. A further advantage of this plan is that it gives a means of graduating the intensity of the attack on the young rootlets of the germinating seed while at the same time, insuring the presence of sufficient bacteria to properly stimulate the growth of the plant after it has arrived at a more vigorous stage.

From laboratory experiments, I have ascertained that it is possible to injure instead of aid the germinating plant by the employment of too large a colony of virulent bacteria during the germinating of the seed. In fact, in experiments carried out by me with peas, the bacteria had not only retarded the growth of the rootlets but had actually reduced the pea seed to a mere husk or shell. All danger from this source is entirely avoided by the use of the composite culture.

Having thus described my invention, what I claim as new and desire to secure by Letters Patent, is:

1. The process of developing a bacteriological culture, which consists in growing in a medium a plant inoculated with the desired bacteria while excluding all contaminations from said plant and medium.

2. The process of developing a bacteriological culture, which consists in growing in a non-nitrogenous medium, a plant inoculated with nitrogen gathering bacteria while excluding all contaminations from said plant and medium.

3. The process of developing a bacteriological culture, which consists in growing a plant, inoculated with the desired bacteria within a germ proof inclosure.

4. The process of developing a bacteriological culture, which consists in growing a plant inoculated with the desired bacteria, within a germ proof inclosure, while maintaining a restricted supply of sterilized air to said inclosure.

5. The process of developing a bacteriological culture, which consists in growing a plant inoculated with the desired bacteria within a transparent germ proof inclosure.

6. The process of developing a bacteriological culture, which consists in growing, in a substantially transparent medium, a plant inoculated with the desired bacteria while excluding all contaminations from the plant and medium by a transparent germ proof inclosure.

7. The process of developing a bacteriological culture, which consists in planting, in a sterilized medium, within a germ proof inclosure, a vital seed free from contaminating germs maintaining a supply of sterilized air to said inclosure and supplying sterilized water to the plant.

8. The process of developing a bacteriological culture, which consists in growing a plant inoculated with the desired bacteria, within a germ proof inclosure, and then inoculating a medium with a portion of the roots of said plant.

9. The process of developing a bacteriological culture, which consists in growing a plant inoculated with the desired bacteria, in a medium within a germ proof inclosure and then inoculating another medium with a portion of the roots of said plant.

10. The process of developing a bacteriological culture, which consists in growing a plant, inoculated with the desired bacteria, within a germ proof inclosure, removing a nodule from said plant and inoculating a medium with the same.

11. The process which consists in preparing a composite culture consisting of a plurality of kinds of nitrogen gathering bacteria, then inoculating seed with such composite culture and planting the seed.

12. The process which consists in inoculating seed with a composite culture consisting of a plurality of kinds of nitrogen gathering bacteria, one of which kinds is specific to said seed, and then planting the seed.

13. The process which consists in inoculating the medium with a plurality of different kinds of nitrogen gathering bacteria to form a composite culture, and then preparing from said composite culture the cultures to be distributed.

14. The process of producing a bacteriological culture, which consists in growing a culture on a substantially solid medium and then adding a liquid to the solid medium.

15. The process of producing a bacteriological culture, which consists in first preparing a substantially solid medium, in a distributing vessel, inoculating it with nitrogen gathering bacteria, maintaining the medium under the required condition to develop the culture, then adding water to the top of the medium and finally sealing said distributing vessel.

16. A bacteriological culture comprising a medium, a plant growing in said medium and inoculated with the desired bacteria, in combination with a germ proof receptacle inclosing the plant and medium.

17. The combination, with a transparent germ proof receptacle, of a medium within said receptacle, and a plant inclosed by said receptacle and rooted in the medium, said plant being inoculated with the desired bacteria.

18. The combination, with a germ proof receptacle provided with means for maintaining a supply of sterilized air to its interior, of a medium within said receptacle, and a plant inoculated with the desired bacteria inclosed by said receptacle and rooted in the medium.

19. The combination, with a germ-proof receptacle pervious to air, of a medium within said receptacle, and a plant inoculated with the desired bacteria inclosed by said receptacle and rooted in the medium.

20. The combination, with a germ-proof transparent receptacle, of a substantially transparent medium within said receptacle and a plant inoculated with the desired bacteria inclosed and protected against contaminations by said receptacle and rooted in the medium.

21. The combination, with a glass vessel having an air inlet and an air filter in said inlet, of a medium in said vessel, and a plant inoculated with the desired bacteria inclosed by the vessel and rooted in the medium.

22. The combination, with a vessel, having an air inlet and a lateral opening, a closure for said opening and an air filter in the air inlet, a medium in said vessel and accessible through the lateral opening and a plant inoculated with the desired bacteria, inclosed by the vessel and rooted in the medium.

23. A bacteriological culture comprising a plant inoculated with the desired bacteria, in combination with a germ-proof receptacle surrounding said plant and provided with means for permitting access to the roots of said plant.

24. A bacteriological culture comprising a medium, a plant growing in said medium and inoculated with the desired bacteria, in combination with a germ-proof receptacle inclosing the plant and medium and provided with means for permitting access to the roots of said plant.

25. A distributing package of nitrogen gathering bacteria containing a plurality of kinds of such bacteria.

26. A distributing package of nitrogen gathering bacteria comprising a composite culture of several kinds of virulent nitrogen gathering bacteria.

27. A distributing package comprising a sealed receptacle containing a substantially solid and also a liquid medium, and nitrogen gathering bacteria in said media.

28. A distributing package comprising a receptacle, means for restricting the access of air to said receptacle, a substantially solid medium in said receptacle, a liquid upon said solid medium and a colony of nitrogen gathering bacteria in said medium.

29. A distributing package comprising a receptacle, means for restricting the access of air to said receptacle, a substantially solid medium in said receptacle, a liquid upon said medium, and a composite colony of different kinds of nitrogen gathering bacteria in said medium.

30. The combination, with a germ-proof receptacle provided with means for maintaining a supply of sterilized air to its interior, of a nitrogen-free medium within said receptacle and a plant inoculated with nitrogen-gathering bacteria inclosed by said receptacle and rooted in the medium.

31. A bacteriological culture comprising a nitrogen-free medium, a plant growing in said medium and inoculated with nitrogen gathering bacteria, in combination with a germ-proof receptacle inclosing the plant and medium, said receptacle being provided with means for maintaining a supply of sterilized air to its interior and with means for permitting access to the roots of said plant.

32. The process of developing a bacteriological culture, which consists in growing in a non-nitrogenous medium, a plant inoculated with nitrogen-gathering bacteria within a germ-proof inclosure, while maintaining a restricted supply of sterilized air to the interior of said inclosure, removing a nodule from said plant and inoculating a medium with said nodule.

33. The process of producing a bacteriological culture, which consists in first preparing a substantially solid medium, in a distributing vessel, inoculating it with nitrogen gathering bacteria, maintaining the medium under the required condition to develop the culture, then adding liquid to the top of the medium and finally sealing said distributing vessel.

34. A distributing package comprising a receptacle, a medium within said receptacle and a plurality of kinds of bacteria in said medium, one of said kinds of bacteria being a nitrogen-gathering bacteria specific to the particular plant on which the culture is to be used.

In testimony whereof I hereunto affix my signature in the presence of two witnesses.

GEORGE HERBERT EARP-THOMAS.

Witnesses:
M. C. MASSIE,
E. O. HILDEBRAND.